United States Patent [19]
Ishida

[11] Patent Number: 5,947,083
[45] Date of Patent: Sep. 7, 1999

[54] IDLING ENGINE SPEED CONTROL UNIT

[75] Inventor: Yasuhiko Ishida, Hyogo-ken, Japan

[73] Assignee: Mitsubishi Denki Kabushiki Kaisha, Tokyo, Japan

[21] Appl. No.: 08/998,054

[22] Filed: Dec. 24, 1997

[30] Foreign Application Priority Data

May 12, 1997 [JP] Japan ..................................... 9-120973

[51] Int. Cl.$^6$ .................................................. F02M 3/00
[52] U.S. Cl. .................. 123/339.11; 123/339.12
[58] Field of Search ........................... 123/339.11, 339.12

[56] References Cited

U.S. PATENT DOCUMENTS

| | | | |
|---|---|---|---|
| 4,338,899 | 7/1982 | Geiger et al. | 123/339.11 |
| 4,344,397 | 8/1982 | Geiger et al. | 123/339.11 |
| 4,508,075 | 4/1985 | Takao et al. | 123/339.11 |
| 5,113,827 | 5/1992 | Vincent | 123/339.11 |

FOREIGN PATENT DOCUMENTS 61-53544  11/1986  Japan .

*Primary Examiner*—Erick R. Solis
*Attorney, Agent, or Firm*—Sughrue, Mion, Zinn, Macpeak & Seas, PLLC

[57] ABSTRACT

The idling engine speed is controlled to a target value at a high response speed with high accuracy even during the control of the air/fuel ratio by correcting the ignition time which is effected by obtaining the concentration of oxygen and calculating an air/fuel ratio correction value of fuel based on the concentration of oxygen during idling and the control of the air/fuel ratio.

3 Claims, 4 Drawing Sheets

IDLING ENGINE SPEED CONTROL UNIT

BACKGROUND OF THE INVENTION

1. Field of the Invention

This invention relates to an idling engine speed control unit for controlling engine speed at the time of idling.

2. Description of the Prior Art

The engine speed is controlled to a predetermined idling engine speed in an idle running state. This idling engine speed is set to a low speed to minimize fuel consumption at the time of idling and swift and high-accuracy controllability is required to suppress variations in engine speed caused by disturbance. A conventional idling engine speed control unit is disclosed by Japanese Patent No. Sho 61-53544, for example. This unit detects an engine speed at the time of the idling of an engine, adjusts the amount of an air-fuel mixture to be supplied to the engine so that the engine speed agrees with a target engine speed predetermined according to engine operation conditions, obtains a difference between the actual engine speed and the target engine speed and suppresses a change in engine speed by correcting the ignition time to eliminate this difference.

The factors of causing changes in engine speed at the time of idling include load changes caused by turning on and off a load, changes in air/fuel ratio and the like. Conventionally, the engine speed has been controlled to a predetermined idling engine speed by detecting a change in engine speed and feed-back controlling the ignition time and the volume of intake air of the engine.

However, the feed-back control of the engine speed as in the prior art has such a problem that the beginning of a change in engine speed or a small change cannot be handled because a feed-back operation is started when a change in engine speed exceeds a predetermined value. When the control of the air/fuel ratio is carried out at the time of idling, a change in engine speed cannot be absorbed by the above-described control method because a change in engine torque caused by a rich or lean air/fuel ratio is large.

SUMMARY OF THE INVENTION

It is therefore an object of the present invention to provide an idling engine speed control unit which is capable of controlling idling engine speed to a target engine speed at a high response speed with high accuracy even during the control of the air/fuel ratio.

According to a first aspect of the present invention, there is provided an idling engine speed control unit wherein the air/fuel ratio correction value of fuel is calculated based on the concentration of oxygen to correct the ignition time during idling and the control of the air/fuel ratio.

Generally speaking, when the air/fuel ratio is rich, the engine torque is large whereas when the air/fuel ratio is lean, the engine torque is small. In the present invention, a torque change is estimated from a measured air/fuel ratio to correct the ignition time. The above air/fuel ratio correction value is used to correct the air/fuel ratio of fuel based on the difference between a predetermined air/fuel ratio and an air/fuel ratio corresponding to the concentration of oxygen contained in an exhaust gas obtained from the output of an $O_2$ sensor. For instance, when the actual air/fuel ratio continues to be smaller than the target air/fuel ratio, the above difference of the air/fuel ratio is calculated as a value proportional to a time integrated value so as to increase the above air/fuel ratio correction value.

According to a second aspect of the present invention, there is provided an idling engine speed control unit wherein the difference between the air/fuel ratio correction value and the average value of air/fuel ratio correction values during a fixed time is taken as an air/fuel ratio for correcting an ignition time, the relationship between the air/fuel ratio for correcting an ignition time and the ignition time correction value is prestored in an electronic control unit as a function, and the ignition time correction value is calculated from the above prestored function based on the calculated air/fuel ratio correction value at the time of correcting the ignition time.

According to a third aspect of the present invention, there is provided an idling engine speed control unit wherein when the ignition time is corrected using the air/fuel ratio correction value of fuel before a predetermined time as an air/fuel ratio used for the calculation of an ignition time, the temperature of cooling water for the engine is detected and the predetermined time is calculated from the functions of the temperature of cooling water for the engine and the predetermined time stored in the electronic control unit based on the above detected value of the temperature of cooling water for the engine.

The above and other objectives, features and advantages of the invention will become more apparent from the following description when taken in conjunction with the accompanying drawings.

BRIEF DESCRIPTION OF THE ACCOMPANYING DRAWINGS

Figure 4:
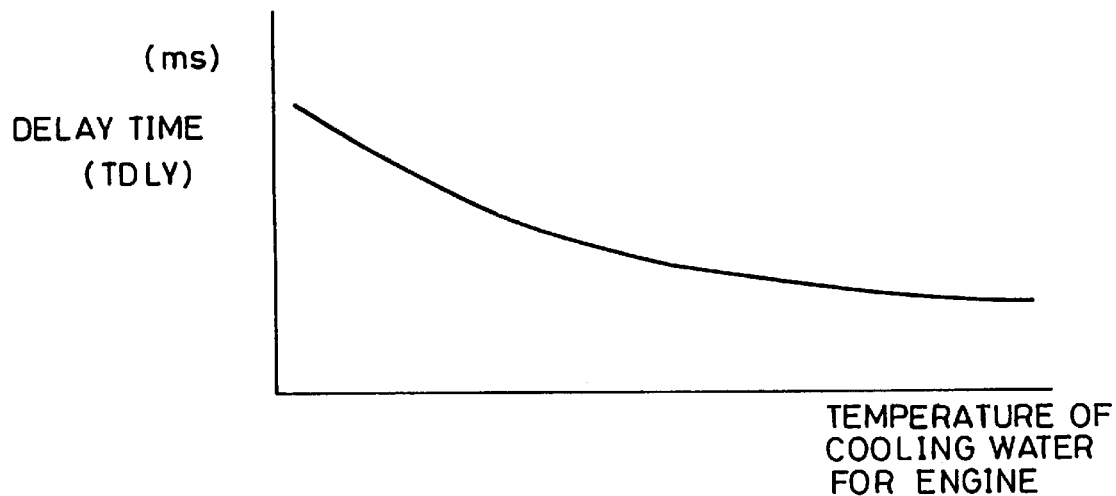
Figure 5:
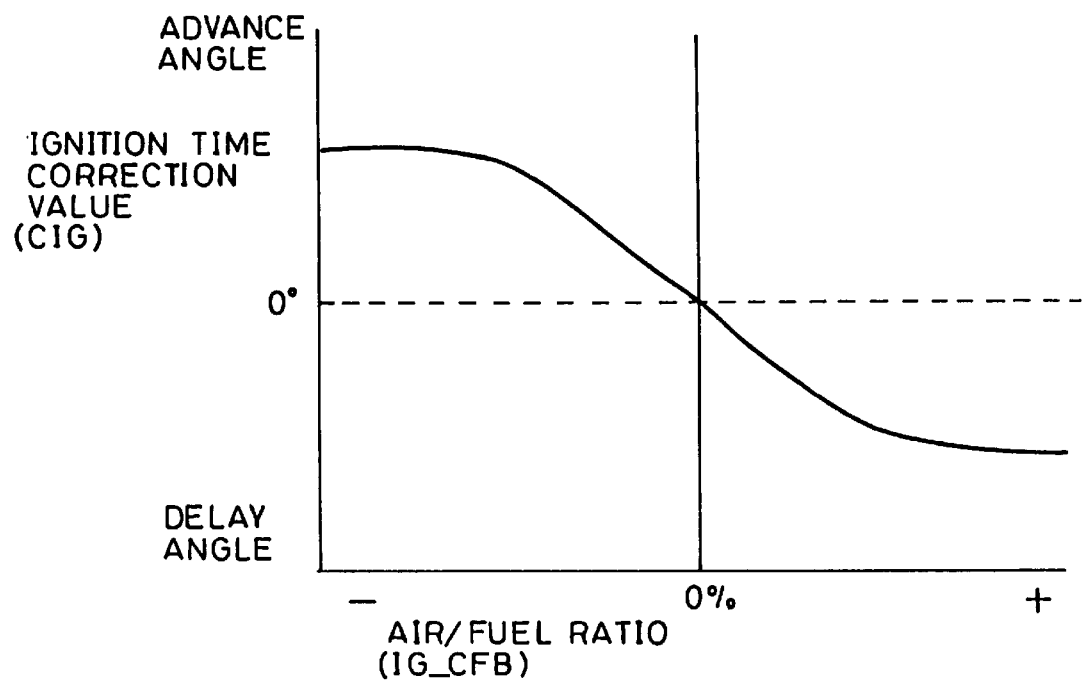

FIG. 4 is a diagram showing the relationship between the temperature of cooling water for the engine and the fuel delivery delay time (TDLY) according to the embodiment of the present invention; and FIG. 5 is a diagram showing the relationship between the air/fuel ratio for correcting an ignition time (IG-CFB) and the ignition time correction value (CIG) according to the embodiment of the present invention.

DETAILED DESCRIPTION OF THE PREFERRED EMBODIMENT

A preferred embodiment of the present invention is described hereunder with reference to the accompanying drawings.

Figure 1:
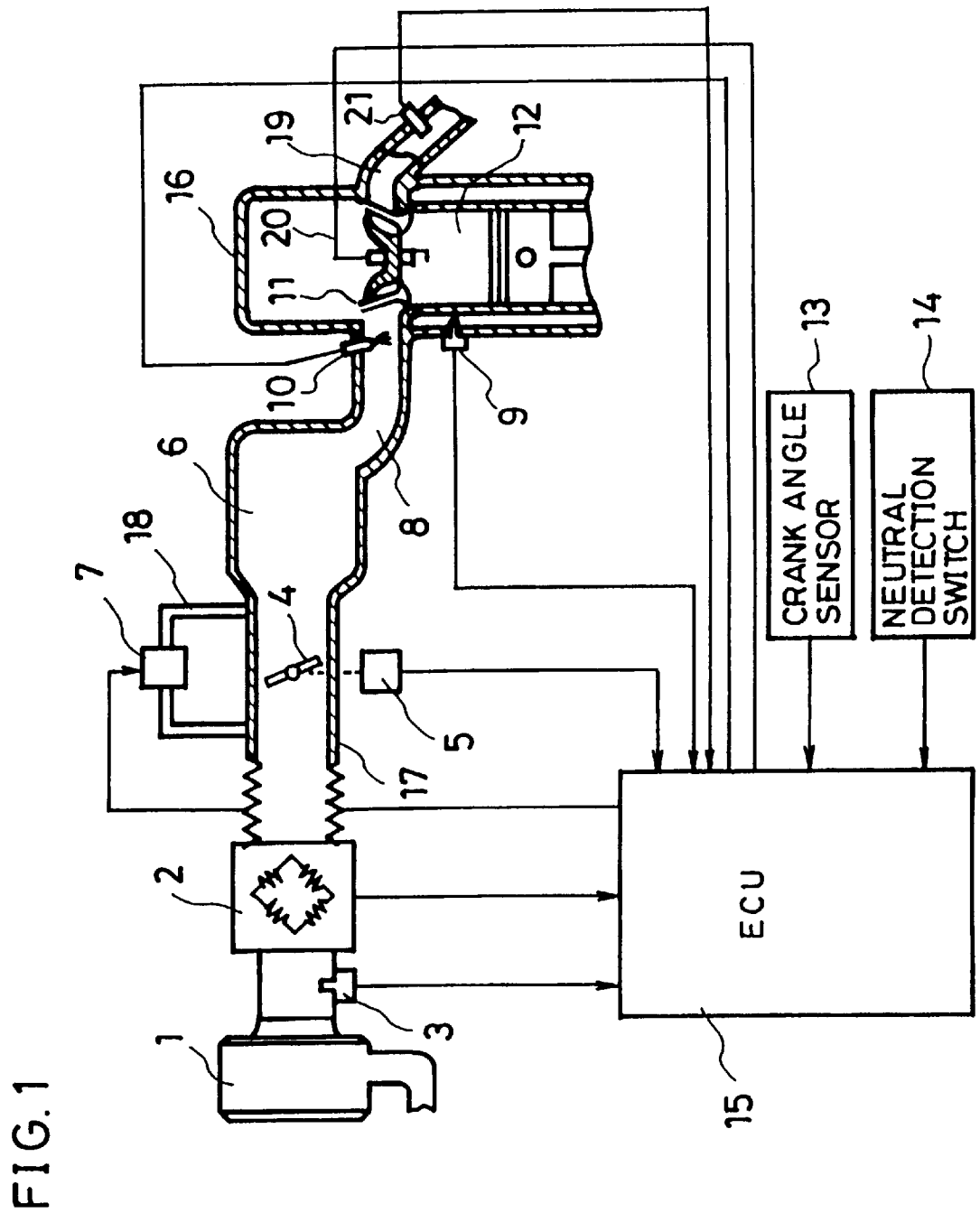
FIG. 1 is a structural diagram of an idling engine speed control unit according to an embodiment of the present invention.

FIG. 1 is a diagram showing the configuration of an idling engine speed control unit according to an embodiment of the present invention. Reference numeral 1 denotes an air cleaner, 2 an air flow sensor for detecting the volume of intake air of an intake pipe 17, 3 an intake air temperature sensor for detecting the temperature of intake air, 4 a throttle for controlling the volume of intake air of an engine 16, 5 a throttle sensor for detecting the opening of the throttle 4, 6 a serge tank, 7 an electromagnetic air control valve (ISC valve) provided in a passage 18 bypassing the upstream and downstream of the throttle 4, 8 an intake manifold, 9 a water temperature sensor for detecting the temperature of cooling water of the engine, 10 an injector for injecting fuel, 11 an intake valve, 12 a cylinder, 13 a crank angle sensor for detecting an engine speed and a crank angle, 14 a neutral switch for detecting that the engine has no load, 20 an ignition plug, 21 an O$_2$ sensor, provided in an exhaust pipe 19, for detecting an air/fuel ratio, and 15 an electronic control unit (ECU) for controlling fuel (air/fuel ratio), ISC valve, ignition and the like based on input signals from the above sensors.

Figure 2:
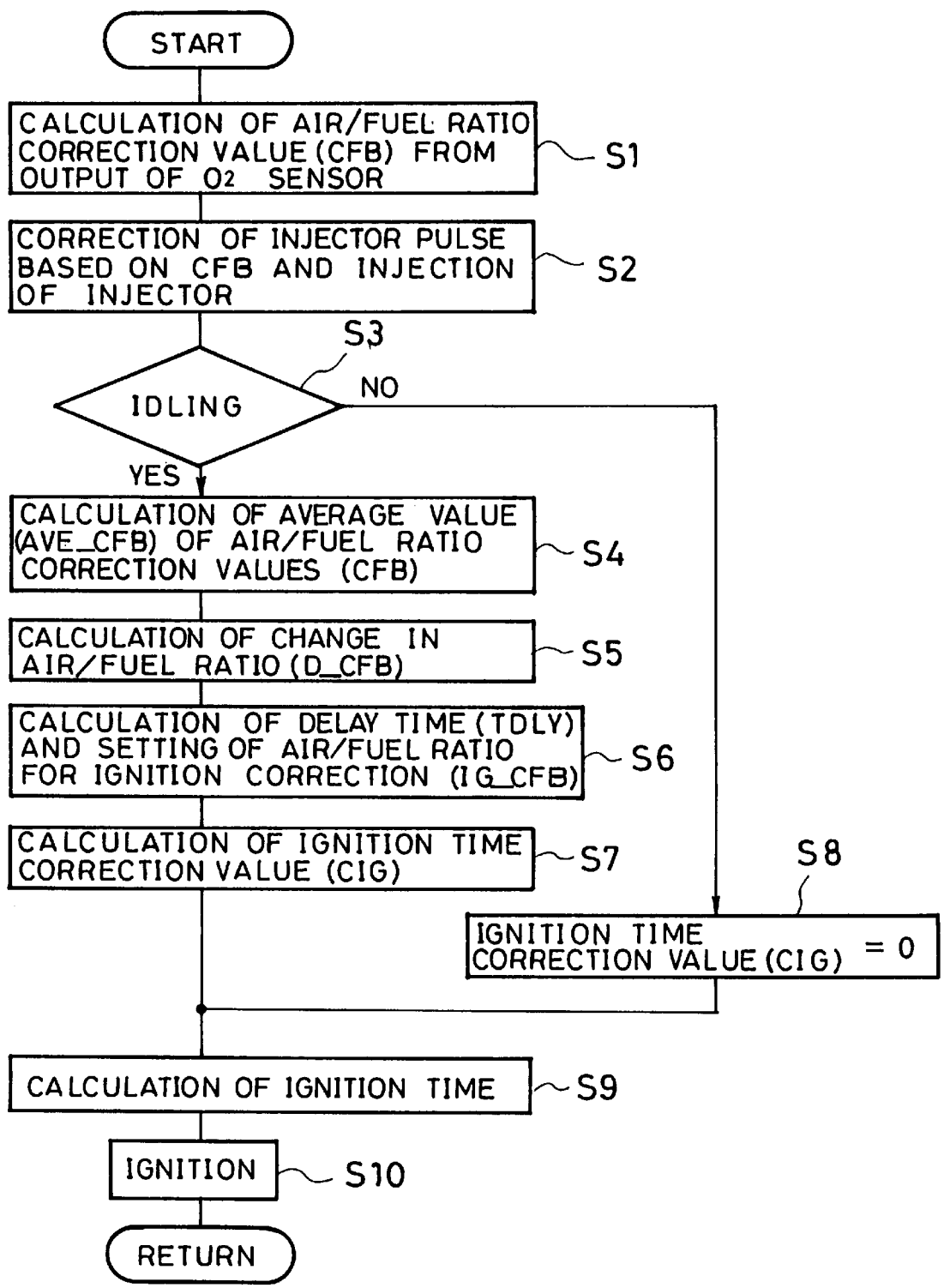
FIG. 2 is a flow chart for explaining the operation of controlling the idling engine speed to a target value during the control of the air/fuel ratio according to the embodiment of the present invention.
Figure 3:
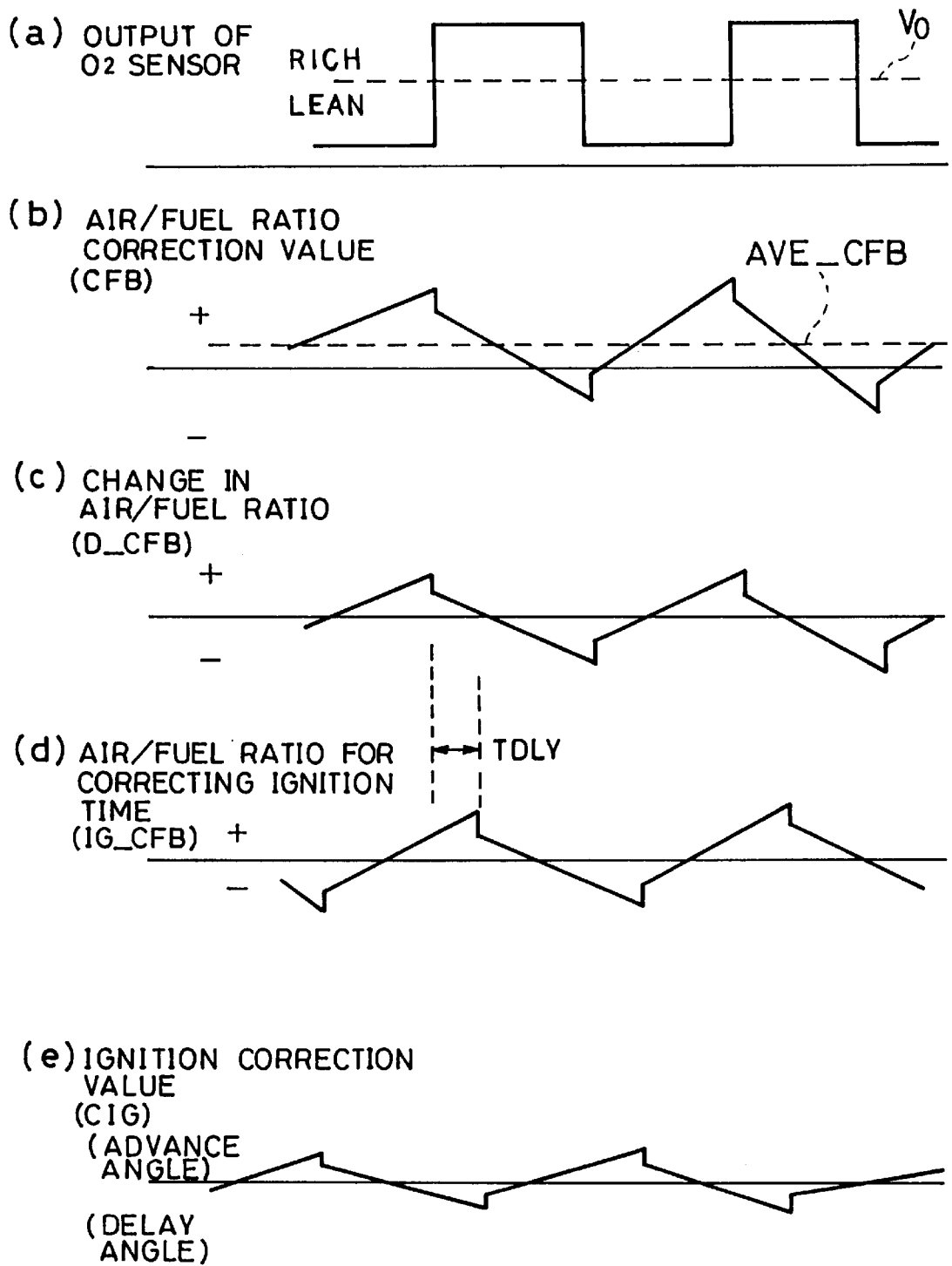
FIG. 3 is a timing chart for explaining the operation of controlling the idling engine speed to a target value during the control of the air/fuel ratio according to the embodiment of the present invention.

A description is subsequently given of the operation of controlling the idling engine speed to a target value during the control of the air/fuel ratio in the idling engine speed control unit configured as described above with reference to the flow chart of FIG. 2 and the timing chart of FIG. 3. It is first judged whether the current concentration of oxygen is lean or rich with respect to the target concentration of oxygen based on an output signal from the O$_2$ sensor 21 and then the air/fuel ratio correction value of fuel (CFB) is calculated to make the concentration of oxygen equal to a target concentration (step S1). The output of the O$_2$ sensor 21 is, as shown in FIG. 3(A), converted into a rich (high) or lean (low) value with respect to the target concentration of oxygen and the value is output. When the output of the O$_2$ sensor 21 is lean, the air/fuel ratio correction value continues to increase as shown in FIG. 3(B). Therefore, the electronic control unit (ECU) 15 corrects the width of an injector pulse based on the above CBF value (+ in this case) and drives the injector 10 to inject fuel (step S2). To improve response speed for the feed-back control of the air/fuel ratio based on the output of the O$_2$ sensor 21, as shown in FIG. 3(B), when the output of the O$_2$ sensor 21 falls below a reference voltage V$_0$, the ECU 15 greatly changes (skip) the air/fuel ratio correction value.

Thereafter, the ECU 15 judges whether the engine is idle or not (step S3). When the engine is not idle, the ECU 15 sets the ignition time correction value (CIG) of the air/fuel ratio to "0" (no correction) (step S8). When the engine is idle, the ECU 15 calculates an average value (AVE__CFB) of the above air/fuel ratio correction values (CFB) during a fixed time (step S4). AVE__CFB indicates a target air/fuel ratio for the above target concentration of oxygen and can be represented by the following equation when n is the number of sampling times of CFB during the above fixed time.

$$AVE\_CFV = (\Sigma CFV)/n$$

The dotted line of FIG. 3(B) indicates the above AVE__CFV value. A change in air/fuel ratio (D__CFB=CFB__AVE__CFB) which is the difference between each CBF value and the above AVE-CFB value during the above fixed time is then obtained (step S5). D__CFB changes in the same manner as CFB of FIG. 3(B) (see FIG. 3(C)).

Since there is a delivery delay between injection time and supply time until fuel injected by the injector 10 is supplied to the cylinder 12, it is necessary to match the time of supplying fuel with the time of correcting the air/fuel ratio by ignition. Therefore, a change in air/fuel ratio (D__CFB) before a predetermined time (TDLY) is set as the air/fuel ratio for ignition correction (IG-CFB) for obtaining an ignition time correction value (CIG) (step S6). The above TDLY is called "delivery delay time" which is changed by the temperature of cooling water for the engine as shown in FIG. 4. As the lower the temperature of the cooling water the longer it takes to vaporize fuel, the lower the temperature of the cooling water the longer TDLY becomes. TDLY is prestored in a ROM in the ECU 15 in the form of map data as a function of the temperature of cooling water for the engine and calculated by interpolation using the temperature of cooling water for the engine obtained from the output of the water temperature sensor 8 as a parameter.

An ignition time correction value (CIG) is calculated from the above set air/fuel ratio for ignition correction (IG-CFB) (step S7). The ignition time correction value (CIG) is prestored in the ROM in the ECU 15 in the form of map data as a function of the air/fuel ratio for ignition correction (IG-CFB) as shown in FIG. 5 and calculated by interpolation using the value of the above set IG-CFB as a parameter. The above air/fuel ratio for ignition correction and the ignition time correction value have such a relationship that when the air/fuel ratio is high, the ignition time is delayed to reduce toque and when the air/fuel ratio is low, the ignition time is advanced to increase torque as shown in FIG. 5 in order to absorb a torque change caused by the air/fuel ratio by changing the ignition time because when the air/fuel ratio is rich, the torque of the engine becomes large with the result of an increased engine speed whereas when the air/fuel ratio is lean, the engine speed reduces. The ignition time is calculated by the equation, (ignition time)=(basic ignition time)+(CIG), using the predetermined basic ignition time and the ignition time correction value of the air/fuel ratio (CIG) calculated in the above step 7 or 8 (step 9) and the engine is ignited (step S10).

According to this embodiment of the present invention, during the idling of the engine and the control of the air/fuel ratio, the air/fuel ratio correction value (CFB) is calculated from the output of the O$_2$ sensor 21, the ignition time correction value of the air/fuel ratio (CIG) is calculated using a change in air/fuel ratio (D__CFB) after a fuel delivery delay time (TDLY) obtained from the output of the water temperature sensor 9 as the air/fuel ratio for ignition correction (IG-CFB), and the ignition time of the engine is corrected by estimating a change in engine torque from the measured air/fuel ratio. Therefore, the ignition time is suitably corrected before a revolution change is caused by a change in air/fuel ratio and the idling engine speed can be efficiently controlled.

According to the embodiment of the present invention, the relationship between the temperature of cooling water for the engine and the delivery delay time and the relationship between the air/fuel ratio (IG-CFB) and the air/fuel ratio for ignition correction (IG-CFB) are prestored in the ROM in the ECU 15 as map data and calculated by primary interpolation using the temperature of cooling water for the engine and the value of air/fuel ratio as parameters. The delivery delay time and the air/fuel ratio may be calculated by forming polynomials approximate to the above relationships, storing the polynomials in the ECU 15 and inserting the values of the temperature of cooling water for the engine and the air/fuel ratio into the polynomials.

As described above, in the idling engine speed control unit according to the first aspect of the invention, since the air/fuel ratio correction value (CFB) can be obtained based on the concentration of oxygen contained in an exhaust gas and the ignition time of the engine can be corrected by estimating a change in engine torque caused by a change in air/fuel ratio, the engine can be ignited at the above corrected ignition time before the occurrence of a revolution change, thereby making it possible to control the idling engine speed efficiently and accurately.

In the idling engine speed control unit according to the second aspect of the present invention, since the air/fuel ratio for correcting an ignition time is calculated from the difference between an air/fuel ratio correction value and an average value of air/fuel ratio correction values during a fixed time, the relationship between the air/fuel ratio for correcting an ignition time and the ignition time correction value is prestored in the electronic control unit as a function, and the ignition time correction value is calculated from the above prestored function based on the calculated air/fuel ratio for correcting an ignition time when the ignition time is to be corrected, a change in air/fuel ratio can be grasped precisely and the control accuracy of the idling engine speed can be further improved.

In the idling engine speed control unit according to the third aspect of the present invention, since the relationship between the temperature of cooling water for the engine and the fuel delivery delay time (TDLY) is prestored in the electronic control unit and the delay time is calculated form the measured temperature of cooling water for the engine, the fuel delivery delay time can be estimated precisely and the air/fuel ratio can be synchronized with the ignition time correction precisely. Therefore, the idling engine speed can be controlled with high accuracy.

What is claimed is:

1. An engine idling speed control system, comprising; a first control unit for controlling an engine speed to a predetermined target engine speed when an engine is idling, an air/fuel ratio control unit for feed-back controlling an air/fuel ratio to a target value based on a concentration of oxygen contained in an exhaust gas, and an ignition timing control unit, said ignition timing control unit including means for correcting ignition timing based on an air/fuel ratio correction value which is calculated solely from a difference between the target value of the air/fuel ratio and the air/fuel ratio corresponding to the concentration of oxygen during idling.

2. The idling engine speed control unit of claim 1, wherein a difference between an air/fuel ratio correction value and an average value of air/fuel ratio correction values during a fixed time is taken as an air/fuel ratio for correcting an ignition time, a relationship between the air/fuel ratio for correcting an ignition time and an ignition time correction value is prestored in an electronic control unit as a function, and the ignition time is corrected by obtaining the ignition time correction value from the prestored function based on the calculated air/fuel ratio correction value.

3. The engine idling speed control unit of claim 1, further comprising a detector for detecting a temperature of an engine's cooling water, wherein said ignition timing control unit further includes means for further correcting ignition timing based on a fuel delivery delay time which is calculated from a function representing a relationship between the detected engine cooling water temperature and a predetermined delay time stored in said control unit.

* * * * *